US012624146B2

(12) United States Patent
Suzuki et al.

(10) Patent No.: US 12,624,146 B2
(45) Date of Patent: May 12, 2026

(54) POLYURETHANE COMPOSITION

(71) Applicants: Dow Global Technologies LLC, Midland, MI (US); Dow Silicones Corporation, Midland, MI (US)

(72) Inventors: Masayuki Suzuki, Tokyo (JP); Arjun Raghuraman, Pearland, TX (US); John W. Weston, Sugar Land, TX (US); An Kaga, Rosharon, TX (US); Richard J. Keaton, Pearland, TX (US); Adrian J. Birch, Kempraten-Jona (CH); Maria Jose Cotanda Santapau, Lake Jackson, TX (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 501 days.

(21) Appl. No.: 18/041,632

(22) PCT Filed: Oct. 19, 2021

(86) PCT No.: PCT/US2021/055589

§ 371 (c)(1),
(2) Date: Feb. 14, 2023

(87) PCT Pub. No.: WO2022/086946

PCT Pub. Date: Apr. 28, 2022

(65) Prior Publication Data

US 2023/0312803 A1 Oct. 5, 2023

Related U.S. Application Data

(60) Provisional application No. 63/104,558, filed on Oct. 23, 2020.

(51) Int. Cl.
*C08G 18/08* (2006.01)
*C08G 18/10* (2006.01)
(Continued)

(52) U.S. Cl.
CPC ......... *C08G 18/0895* (2013.01); *C08G 18/10* (2013.01); *C08G 18/16* (2013.01);
(Continued)

(58) Field of Classification Search
None
See application file for complete search history.

(56) References Cited

U.S. PATENT DOCUMENTS 3,278,457 A 10/1966 Milgrom
3,278,458 A 10/1966 Belner
(Continued)

FOREIGN PATENT DOCUMENTS

WO 2019055725 3/2019
WO 2019055727 3/2019
(Continued)

OTHER PUBLICATIONS

Polymerization of Propylene Oxide Using Double Metal Cyanide Catalysts and the Application to Polyurethane Elastomers, by Il Kim, Journal: Polymer, vol. 44, Issue 11, pp. 3417-3428 (Year: 2003).*

(Continued)

*Primary Examiner* — Marc S Zimmer
*Assistant Examiner* — Virginia L Stonehocker

(57) ABSTRACT

Embodiments relate to a coating, adhesive, sealant, elastomer, or reaction injection molded material forming polyurethane composition that comprises an isocyanate component that includes at least one isocyanate-terminated prepolymer, and an isocyanate reactive component that includes at least one Lewis acid catalyst polymerized polyether polyol having a weight average molecular weight from 200 g/mol to 1,000 g/mol, an average primary hydroxyl group content of at least 30%, and an average acetal content of at least 0.05 wt %.

10 Claims, 1 Drawing Sheet

(51) Int. Cl.

| | |
|---|---|
| ***C08G 18/16*** | (2006.01) |
| ***C08G 18/48*** | (2006.01) |
| ***C08L 75/08*** | (2006.01) |
| ***C09D 175/08*** | (2006.01) |
| ***C09J 175/08*** | (2006.01) |

(52) U.S. Cl.

CPC ..... *C08G 18/4829* (2013.01); *C08G 18/4845* (2013.01); *C08L 75/08* (2013.01); *C09D 175/08* (2013.01); *C09J 175/08* (2013.01); *C08G 2150/00* (2013.01); *C08G 2170/00* (2013.01); *C08G 2190/00* (2013.01)

(56) References Cited

U.S. PATENT DOCUMENTS

| | | | |
|---|---|---|---|
| 3,278,459 | A | 10/1966 | Herold |
| 3,404,109 | A | 10/1968 | Milgrom |
| 3,427,256 | A | 2/1969 | Milgrom |
| 3,427,334 | A | 2/1969 | Belner |
| 3,427,335 | A | 2/1969 | Herold |
| 5,470,813 | A | 11/1995 | Le-Khac |
| 2011/0105802 | A1 | 5/2011 | Villa et al. |
| 2018/0273676 | A1 | 9/2018 | Raghuraman et al. |
| 2019/0241780 | A1 | 8/2019 | Gelfer et al. |
| 2022/0064365 | A1 | 3/2022 | Emge et al. |

FOREIGN PATENT DOCUMENTS

| | | | |
|---|---|---|---|
| WO | 2019055734 | 3/2019 | |
| WO | 2019055740 | 3/2019 | |
| WO | 2019055742 | 3/2019 | |
| WO | WO-2020127814 A1 * | 6/2020 | ......... C08G 65/2654 |

OTHER PUBLICATIONS

PCT/US2021/055589 International Search Report and Written Opinion with a mailing date of Jan. 31, 2022.

Toru Miyajima et al: "Synthesis and process development of polyether polyol" vol. 37, No. 12, Aug. 26, 2015 pp. 771-778.

* cited by examiner

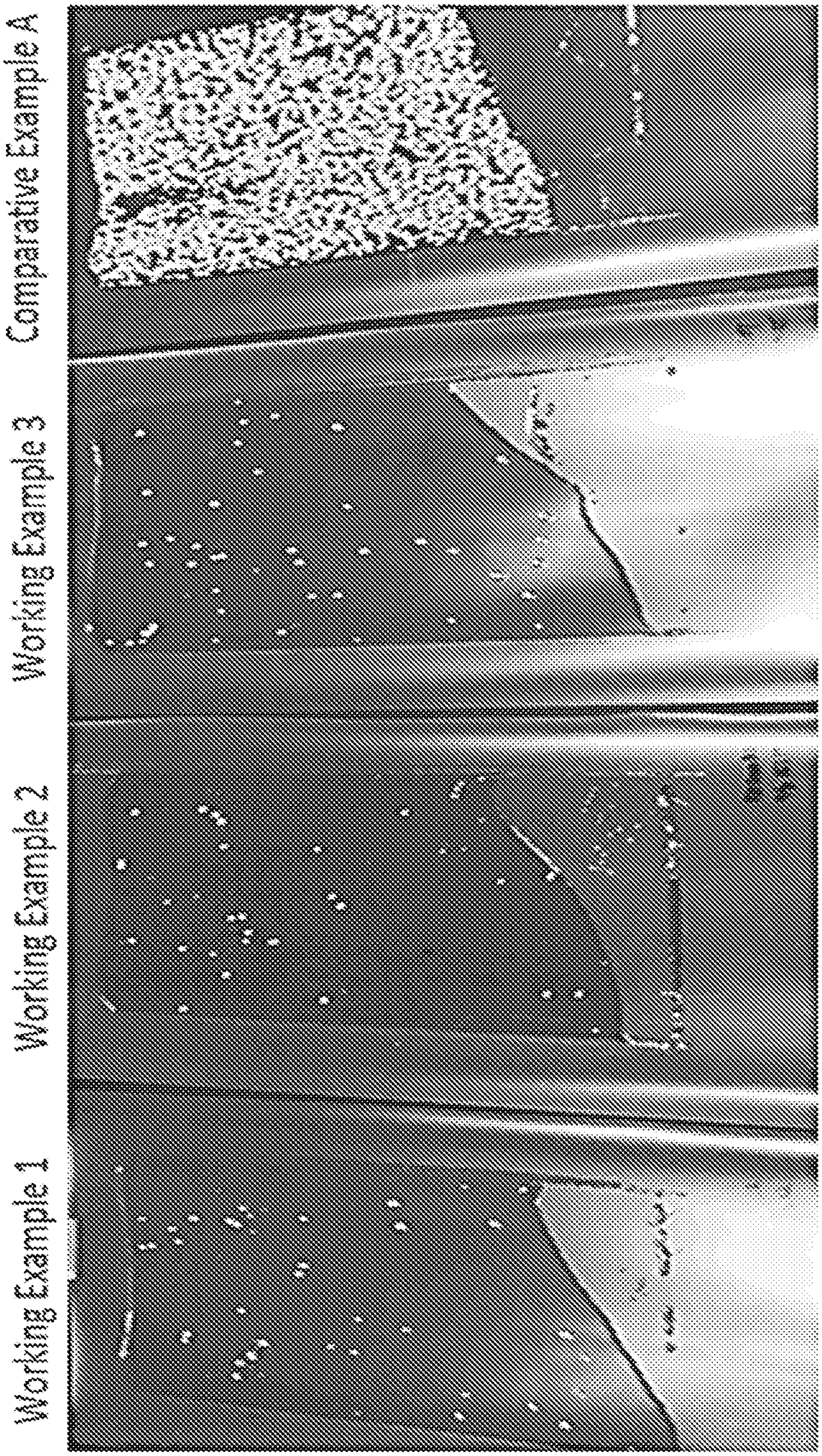
Comparative Example A
Working Example 3
Working Example 2
Working Example 1

POLYURETHANE COMPOSITION

FIELD

Embodiments relate to a two component polyurethane composition for use in coatings, adhesives, sealants, elastomers, and materials formed from reaction injection molding (RIM), which composition includes at least one prepolymer and a Lewis acid catalyst polymerized polyol, and/or polyurethane products prepared using the polyurethane composition.

INTRODUCTION

Polyurethane products such as coatings, adhesives, sealants, elastomers, and materials formed from reaction injection molding (RIM) may be produced by reacting an isocyanate component with an isocyanate-reactive component. The isocyanate component may include at least one prepolymer, e.g. an isocyanate-terminated prepolymer. The isocyanate-reactive component may include at least one polyether polyol that is produced by reacting an initiator with an alkylene oxide in the presence of a catalyst, which can also be referred to as epoxide alcoholysis. The initiator has one or more functional groups the alkylene oxide can react with to begin forming polymer chains and may establish the number of hydroxyl groups that the resultant polyether polyol will have. The use of a Lewis acid polymerization catalyst for such polymerization to form a Lewis acid catalyst polymerized polyether polyol has been proposed for use to, e.g., improve appearance of the polyurethane product, while still allowing for a fast cure time.

SUMMARY

Embodiments may be realized by providing a coating, adhesive, sealant, elastomer, or reaction injection molded material forming polyurethane composition, the composition comprising an isocyanate component that includes at least one isocyanate-terminated prepolymer and an isocyanate reactive component that includes at least one Lewis acid catalyst polymerized polyether polyol having a weight average molecular weight from 200 g/mol to 1,000 g/mol, an average primary hydroxyl group content of at least 30% based on total number of hydroxyl groups, and an average acetal content of at least 0.05 wt % based on total weight of the Lewis acid catalyst polymerized polyol. A Lewis acid catalyst for forming the Lewis acid catalyst polymerized polyether polyol has a general formula $M(R^1)_1(R^2)_1(R^3)_1(R^4)_{0\ or\ 1}$, whereas M is boron, aluminum, indium, bismuth or erbium, $R^1$, $R^2$, $R^3$, and $R^4$ are each independent, $R^1$ includes a first fluoro/chloro or fluoroalkyl-substituted phenyl group, $R^2$ includes a second fluoro/chloro or fluoroalkyl-substituted phenyl group, $R^3$ includes a third fluoro/chloro or fluoroalkyl-substituted phenyl group or a first functional group or functional polymer group, optional $R^4$ is a second functional group or functional polymer group.

BRIEF DESCRIPTION OF THE DRAWINGS

FIG. 1 illustrates the resultant films for Working Examples 1 to 3 and Comparative Example A.

DETAILED DESCRIPTION

Embodiments relate to a two component polyurethane composition for use in coatings, adhesives, sealants, elastomers, and materials formed from reaction injection molding (RIM), in which the composition with a specific type of Lewis acid catalyzed polyol results in a polyurethane based product with a lower amount of bubbles, e.g., in comparison to when such polyurethane based product is prepared with a composition that includes a general polyol prepared with DMC catalyst technology. The polyurethane composition includes an isocyanate component that includes at least one prepolymer and an isocyanate reactive component that includes at least the Lewis acid catalysis polymerized polyether polyol.

The isocyanate component includes at least one isocyanate-terminated prepolymer and may optionally include one or more polyisocyanates (such as those known for use in the art). For the example, the isocyanate component includes at least 50 wt % (at least 60 wt %, at least 70 wt %, at least 80 wt %, at least 90 wt %, at least 95 wt %, at least 98 wt %, etc.) of one or more isocyanate-terminated prepolymer, based on a total weight of the isocyanate component. The isocyanate reactive component includes at least the Lewis acid catalyst polymerized polyether polyol, e.g., a least 50 wt %, 60 wt %, 70 wt %, 80 wt %, and/or 90 wt %, based on a total weight of the isocyanate-reactive component. The isocyanate component and/or the isocyanate-reactive component may include one or more additives known in the art for use in polyurethane compositions for use in coatings, adhesives, sealants, elastomers, and materials formed from reaction injection molding. The isocyanate index may be from 60 to 300 (e.g., 80 to 250, 80 to 200, 80 to 150, 90 to 140, 90 to 120, etc.). Isocyanate index refers to the stoichiometric ratio of isocyanate groups to isocyanate-reactive groups provided to the reaction mixture, multiplied by 100.

To form the polyurethane based coatings, adhesives, sealants, elastomers, and materials formed from reaction injection molding (RIM), the isocyanate and isocyanate-reactive components will be mixed and applied to the substrate just before use. Before the components react together to form the polyurethane polymer network, the isocyanate component may generate bubbles from carbon dioxide, e.g., based on a reaction between an isocyanate group (N═C═O) and water (such as water from the isocyanate-reactive component and/or from atmospheric water). Such bubbles may lead to inferior product quality, such as lower adhesion performance and/or poor appearance.

It has been previously proposed to add dehydrating agents such as Zeolite powder to a polyurethane composition to reduce bubbling. However, such a Zeolite powder is an inorganic solid and white in appearance, so it is not useable if desire to form a clear or transparent polyurethane product. Accordingly, it is proposed to use a Lewis acid catalyst polymerized polyether polyol having a weight average molecular weight from 200 g/mol to 1,000 g/mol (e.g., 300 to 800 g/mol, 350 to 700 g/mol, 400 to 600 g/mol, etc), an average primary hydroxyl group content of at least 30% based on total number of hydroxyl groups (e.g., from 30 to 95 wt %, from 40 to 80 wt %, from 40 to 70 wt %, 45 wt % to 65 wt %, 50 wt % to 60 wt %, etc.), and an average content of acetals defined as the weight fraction of aldehyde chemically bound in the polyol of at least 0.05 wt % based on total weight of the Lewis acid catalyst polymerized polyol (e.g., from 0.1 to 1 wt %, from 0.3 to 0.7 wt %, from 0.4 to 0.7 wt %, from 0.5 to 0.7 wt %, etc.). The Lewis acid catalyst polymerized polyether polyol may have a water content of at least 200 ppm (e.g., from 200 to 2000 ppm, from 200 to 1500 ppm, from 200 to 1000 ppm, from 200 to 500 ppm, from 200 to 400 ppm, etc.) Whereas the Lewis acid catalyst for forming the Lewis acid catalyst polymerized polyol having a general formula $M(R^1)_1(R^2)_1(R^3)_1(R^4)_{0\ or\ 1}$. The polyurethane composition may additionally include a solvent or may be solvent-less. The Lewis acid catalyst polymerized polyether polyol may have a numerical hydroxyl functionality from 2 to 10 (e.g., 2 to 8, 2 to 5, 2 to 4, may be a diol or triol, and/or a diol). The Lewis acid catalyst polymerized polyether polyol may be a propylene oxide (1,2-propylene oxide) derived homopolymer and/or a propylene oxide/ethylene oxide copolymer (e.g., with an ethylene oxide content from 1 wt % to 20 wt %, based on a total weight of the alkylene oxides used to form the polyether polyol).

Isocyanate-Terminated Prepolymer

The isocyanate-terminated prepolymer may be prepared as the reaction product of a polyisocyanate component and a polyisocyanate-reactive component. The polyisocyanate component includes at least one polyisocyanate (examples include methylenediphenyl diisocyanate also known as MDI, toluene diisocyanate also known as TDI, and other polyisocyanates known in the art for use in preparing isocyanate-terminated prepolymers). The polyisocyanate-reactive component includes one or more polyether polyols and optionally one or more additives known in the art for use in preparing isocyanate-terminated prepolymers.

The isocyanate-terminated prepolymer may have a free NCO (N═C═O) group content of from 5 wt % to 25 wt % (e.g., 5 wt % to 20 wt %, 10 wt % to 15 wt %, etc.), based on a total weight of the isocyanate-terminated prepolymer. The isocyanate-terminated prepolymer may have a viscosity of from 500 to 10,000 mPa·s at 25° C. (e.g., from 2000 to 9000 mPa·s at 25° C., from 3000 to 7000 mPa·s at 25° C., from 4000 to 6000 mPa·s at 25° C., etc.)

According to exemplary embodiments, the polyisocyanate-reactive component includes a DMC catalyst polymerized polyether polyol. The DMC catalyst polymerized polyether polyol may have a weight average molecular weight from 300 g/mol to 3500 g/mol (e.g., 500 to 3000 g/mol, 500 to 2500 g/mol, 500 to 2000 g/mol, 500 to 1500 g/mol, 750 to 1250 g/mol, 900 to 1100 g/mol, etc.) The DMC catalyst polymerized polyether polyol may have a numerical hydroxyl functionality from 2 to 10 (e.g., 2 to 8, 2 to 5, 2 to 4, may be a diol or triol, and/or a diol). The DMC catalyst polymerized polyether polyol may be a propylene oxide (1,2-propylene oxide), derived homopolymer and/or a propylene oxide/ethylene oxide copolymer (e.g., with an ethylene oxide content from 1 wt % to 20 wt %, based on a total weight of the alkylene oxides used to form the polyether polyol).

The DMC catalyst polymerized polyether polyol that is used to make the isocyanate-terminated prepolymer is different from the Lewis acid catalyst polymerized polyether polyol at least because of the polymerized catalyst used is different. Exemplary DMC polymerization catalysts and method of producing DMC catalyst are described, e.g., in U.S. Pat. Nos. 3,278,457, 3,278,458, 3,278,459, 3,404,109, 3,427,256, 3,427,334, 3,427,335, and 5,470,813. An exemplary type of DMC catalyst is a zinc hexacyanocobaltate catalyst complex. The DMC catalyst complexes may be prepared using modified methods of forming the DMC catalysts. The DMC catalyst, e.g., ones that are known in the art, may be used in the catalyst system that includes the Lewis acid catalyst. The DMC catalyst may be the first or second catalyst that is provided.

For example, the DMC catalysts may be represented by the Formula 1:

$$M_b[M^1(CN)_r(X)_t]_c[M^2(X)_6]_d \cdot nM^3_xA_y \quad \text{(Formula 1)}$$

wherein M and $M^3$ are each metals; $M^1$ is a transition metal different from M. $X^1$ represents a group other than cyanide that coordinates with the $M^1$ ion. $M^2$ is a transition metal. $X^2$ represents a group other than cyanide that coordinates with the $M^2$ ion. $X^1$ or $X^2$ may each independently be a halogen, sulfate, nitrate, phosphate, carbonate, or chlorate. In exemplary embodiments, $X^1$ and $X^2$ are the same and are chloride. $A^1$ represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. For example, n is from 0.01 to 20. The foregoing formula does not reflect the presence of neutral complexing agents such as t-butanol which are often present in the DMC catalyst complex.

Referring to Formula (I), M and $M^3$ each are a metal ion independently selected from (e.g., from the group consisting of): $Zn^{2+}$, $Fe^{2+}$, $Co^{2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. Exemplary embodiments include at least $Zn^{2+}$. Further, $M^1$ and $M^2$ each are a metal ion independently selected from (e.g., from the group consisting of): $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state may be used for the $M^1$ and $M^2$ metal. Exemplary embodiments include $Co^{3+}$ and/or $Fe^{3+}$.

Suitable anions A include, but are not limited to, halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. Exemplary embodiments include the chloride ion.

Referring to Formula (I), r is an integer that is 4, 5 or 6. In exemplary embodiments, r is 4 or 6. Further, t is an integer from 0 to 2, and in exemplary embodiments t is 0. The sum of r+t may equal six.

Lewis Acid Catalyst Polymerized Polyether Polyol

Epoxide alcoholysis is extensively employed in the synthesis of alcohols and it generally requires achieving high rates and selectivity. In a manufacturing process of producing the Lewis acid catalyst polymerized polyether alcohol, an initiator (that includes one or more initiator compounds having a numerical hydroxyl functionality of at least 1), one or more alkylene oxide monomers, and a Lewis acid polymerization catalyst may be fed into a reactor. A Lewis acid polymerization catalyst having a general formula $M(R^1)_1(R^2)_1(R^3)_1(R^4)_{0\ or\ 1}$, whereas M is boron, aluminum, indium, bismuth or erbium, $R^1$, $R^2$, $R^3$, and $R^4$ are each independent, $R^1$ includes a first fluoro/chloro or fluoroalkyl-substituted phenyl group, and $R^2$ includes a second fluoro/chloro or fluoroalkyl-substituted phenyl group, $R^3$ includes a third fluoro/chloro or fluoroalkyl-substituted phenyl group or a first functional group or functional polymer group, optional $R^4$ is a second functional group or functional polymer group, is used during epoxide alcoholysis according to embodiments.

The Lewis acid catalyzed polymerized polyether polyol has a relatively low number average molecular weight (i.e., from 200 g/mol to 1,000 g/mol) The polyether alcohol may have a specified primary hydroxyl group content (e.g., from 30% to 95%, based on a total number of hydroxyl groups), as determined by selectivity from primary hydroxyl groups versus secondary hydroxyl groups. Certain primary hydroxyl content values may be sought after for specific end-use applications of surfactants and further processing to form polyurethanes, based on a desired reactivity speed. For example, some end use applications may seek a rapid reactivity speed, for which a relatively higher primary hydroxyl group content may be sought. Other end-use applications may seek a relatively slow reactivity speed, for which a lower primary hydroxyl group content may be sought.

According to exemplary embodiments, a catalyst component for forming the polyether polyol utilizes the Lewis acid catalyst and optionally a DMC catalyst. For example, the Lewis acid catalyst may be used without the DMC catalyst, or the DMC catalyst and the Lewis acid catalyst may be used simultaneously or sequentially added. For example, in a DMC-Lewis acid dual catalyst system, a polymerization method may include initially adding a DMC catalyst and later adding the Lewis acid catalyst that is separately provided and allowed to react at a lower temperature than the temperature at which the DMC catalyst was added. The Lewis acid catalyst may be active at a lower temperature range (e.g., from 60° C. to 115° C.) than a temperature range at which the DMC catalyst may be active (e.g., from 125° C. to 160° C.).

Polyether alcohols include alcohols that have multiple ether bonds. The polyether alcohols are produced by polymerizing an alkylene oxide component that includes at least one alkylene oxide and an initiator that includes at least one initiator compound. The initiator has one or more functional groups at which the alkylene oxide can react to begin forming the polymer chains. The main functions of the initiator are to provide molecular weight control and to establish the number of hydroxyl groups that the monol or polyol product will have.

The Lewis acid catalyst may be an arylborane catalyst that has at least one fluoro/chloro or fluoroalkyl-substituted phenyl group, which may allow for improvements in the yield of the reaction. The polymerization catalyst may be fed into the reactor in an amount greater than 0 and less than or equal to 0.005 (e.g., greater than 0.0001, less than or equal to 0.003, less than or equal to 0.001, etc.) molar equivalents per mole of the initiator feed into the reactor. The Lewis acid catalyst may be active at a lower temperature range (e.g., from 60° C.-110° C.).

The Lewis acid polymerization catalyst has the general formula $M(R^1)_1(R^2)_1(R^3)_1(R^4)_{0\ or\ 1}$, whereas M is boron, aluminum, indium, bismuth or erbium, $R^1$ includes (e.g., consists of) a first fluoro/chloro or fluoroalkyl-substituted phenyl group, $R^2$ includes (e.g., consists of) a second fluoro/chloro or fluoroalkyl-substituted phenyl group, $R^3$ includes (e.g., consists of) a third fluoro/chloro or fluoroalkyl-substituted phenyl group or a first functional group or functional polymer group, and optional $R^4$ is (e.g., consists of) a second functional group or functional polymer group. As used herewithin, by fluoro/chloro or fluoroalkyl-substituted phenyl group it is mean a fluoro/chloro substituted phenyl group or fluoroalkyl-substituted phenyl group, as described below, is present. By fluoroalkyl-substituted phenyl group it is meant a phenyl group that includes a least one hydrogen atom replaced with a fluoroalkyl group. By fluoro-substituted phenyl group it is meant a phenyl group that includes at least one hydrogen atom replaced with a fluorine atom. By chloro-substituted phenyl group it is meant a phenyl group that includes at least one hydrogen atom replaced with a chlorine atom. By fluoro/chloro substituted phenyl group it is meant a phenyl group that includes at least one hydrogen atom replaced with a fluorine or chlorine atom, whereas the phenyl group can include a combination of fluorine and chlorine atom substituents. $R^1$, $R^2$, and $R^3$ may each independently include the fluoro/chloro or fluoroalkyl-substituted phenyl group or may each independently consist essentially of the fluoro/chloro or fluoroalkyl-substituted phenyl group. The M in the general formula may exist as a metal salt ion or as an integrally bonded part of the formula.

With respect to $R^3$ and optional $R^4$, the functional group or functional polymer group may be a Lewis base that forms a complex with the Lewis acid catalyst (e.g., a boron based Lewis acid catalyst) and/or a molecule or moiety that contains at least one electron pair that is available to form a dative bond with a Lewis acid. The Lewis base may be a polymeric Lewis base. By functional group or functional polymer group it is meant a molecule that contains at least one of the following: water, an alcohol, an alkoxy (examples include a linear or branched ether and a cyclic ether), a ketone, an ester, an organosiloxane, an amine, a phosphine, an oxime, and substituted analogs thereof. Each of the alcohol, linear or branched ether, cyclic ether, ketone, ester, alkoxy, organosiloxane, and oxime may include from 2-20 carbon atoms, from 2-12 carbon atoms, from 2-8 carbon atoms, and/or from 3-6 carbon atoms.

For example, the functional group or functional polymer group may have the formula $(OYH)_n$, whereas O is O oxygen, H is hydrogen, Y is H or an alkyl group, and n is an integer (e.g., an integer from 1 to 100). However, other known functional polymer groups combinable with a Lewis acid catalyst such as a boron based Lewis acid catalyst may be used. Exemplary cyclic ethers include tetrahydrofuran and tetrahydropyran. Polymeric Lewis bases are moieties containing two or more Lewis base functional groups such as polyols and polyethers based on polymers of ethylene oxide, propylene oxide, and butylene oxide. Exemplary polymeric Lewis bases include ethylene glycol, ethylene glycol methyl ether, ethylene glycol dimethyl ether, diethylene glycol, diethylene glycol dimethyl ether, triethylene glycol, triethylene glycol dimethyl ether, polyethylene glycol, polypropylene glycol, and polybutylene glycol.

Without intending to be bound by this theory, certain $R^4$ may help improve shelf life of the catalyst, e.g., without significantly compromising catalyst activity when utilized in a polymerization reaction. For example, the catalyst comprising M, $R^1$, $R^2$, and $R^3$ may be present in the form with the optional $R^4$ (form $M(R^1)_1(R^2)_1(R^3)_1(R^4)_1$) or without the optional $R^4$ (form $M(R^1)_1(R^2)_1(R^3)_1$). The optional $R^4$ may dissociate step-wise from $M(R^1)_1(R^2)_1(R^3)_1(R^4)_1$ to give free $M(R^1)_1(R^2)_1(R^3)_1$, as shown below for M=B, which free $M(R^1)_1(R^2)_1(R^3)_1$ may be a catalyst for an alkoxylation/polymerization process, and/or may dissociate from $M(R^1)_1(R^2)_1(R^3)_1(R^4)_1$ in a concerted or other single-step process with the alkylene oxide to give a catalyst for an alkoxylation/polymerization process.

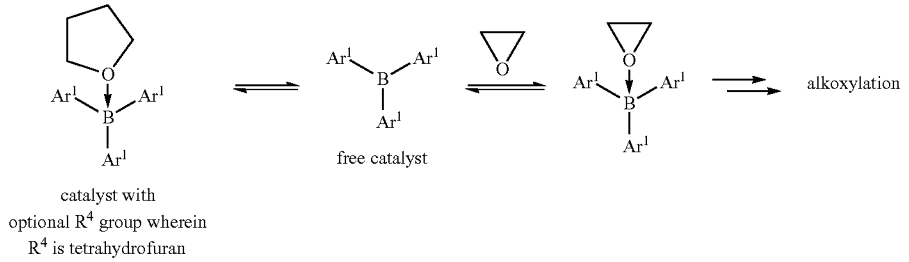

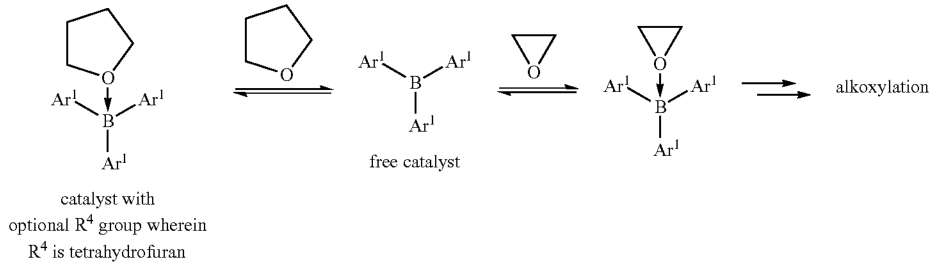

The ability of the optional $R^4$ group to protect the boron, aluminum, indium, bismuth and erbium center from inadvertent decomposition reactions may be related to a decrease in the accessible volume of the center. The accessible volume of the center is defined as the volume around the atom, such as the boron atom, that is available for interaction with other molecules.

| Catalyst | Accessible volume of boron (%) |
|---|---|
| 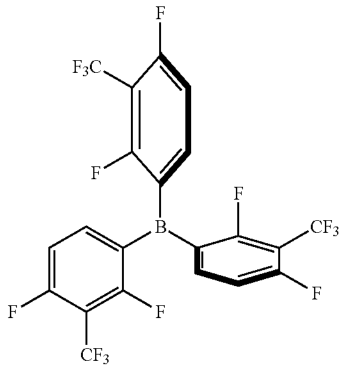 | 25 |
| 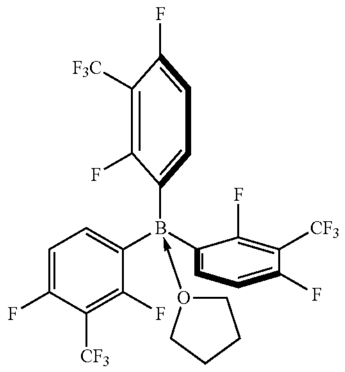 | 10 |

Suitable $R^4$ groups that can help increase catalyst shelf stability, e.g., without compromising catalyst activity, include diethyl ether, cyclopentyl methyl ether, methyl tertiary-butyl ether, tetrahydrofuran, 2-methyltetrahydrofuran, tetrahydropyran, 1,4-dioxane, acetone, methyl isopropyl ketone, isopropyl acetate, and isobutyl acetate.

According to exemplary embodiments, the Lewis acid catalyst is a boron based Lewis acid catalyst that has the general formula $B(R^1)_1(R^2)_1(R^3)_1(R^4)_{0\ or\ 1}$, whereas $R^1$, $R^2$, and $R^3$ are each independently a fluoro-substituted phenyl group, and optional $R^4$ is the functional group or functional polymer group.

In exemplary embodiments, the boron-based Lewis acid is tris(pentafluorophenyl)borane or isopropoxy-bis(pentafluorophenyl)borane wherein $^i$PrO is isopropoxy.

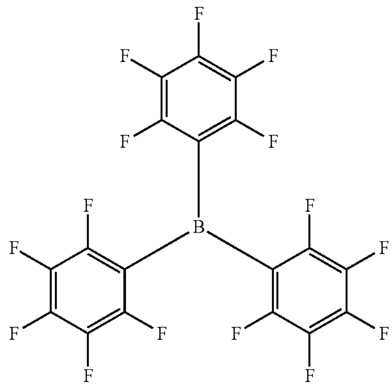
or
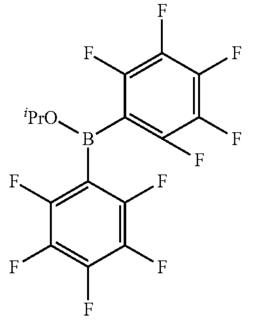

According to exemplary embodiments, the Lewis acid catalyst has the general formula $M(R^1)_1(R^2)_1(R^3)_1(R^4)_{0\ or\ 1}$, whereas M is boron, aluminum, indium, bismuth, or erbium, $R^1$, $R^2$, and $R^3$ are each a fluoroalkyl-substituted phenyl group, and optional $R^4$ is the functional group or functional polymer group discussed above. The M in the general formula may exist as a metal salt ion or as an integrally bonded part of the formula. $R^1$, $R^2$, and $R^3$ may each be an independent fluoroalkyl-substituted phenyl group. For example, $R^1$, $R^2$, and $R^3$ may each be the same fluoroalkyl-substituted phenyl group. $R^1$, $R^2$, and $R^3$ may include the fluoroalkyl-substituted phenyl group or may consist essentially of the fluoroalkyl-substituted phenyl group. Similarly, $R^4$ may include the functional group or functional polymer group, or consist essentially of the $R^4$ is the functional group or functional polymer group. With respect to $R^1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one.

The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R^1$, $R^2$, and $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro groups and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group).

The functional group or functional polymer group $R^4$, if present, may be as a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

In these exemplary embodiments, the Lewis acid catalysts have the following structure in which each of $Ar^1$ includes at least one fluoroalkyl (Y) group substituted on a phenyl group and optionally at least one fluoro or chloro (X) substituted on the phenyl group:

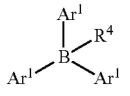

X = F, Cl

Y = fluoroalkyl group containing 1-5 carbons $R^4$ = optional and is a functional group or a functional polymer group -continued

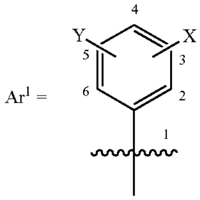

Y can be attached to positions 3, 4, 5 or a combination of these

X can be attached to positions 2, 3, 4, 5 or 6 or a combination of these

Whereas each $Ar^1$ has the same structure. Exemplary structures for $Ar^1$ are the following, referred to as Set 1 structures:

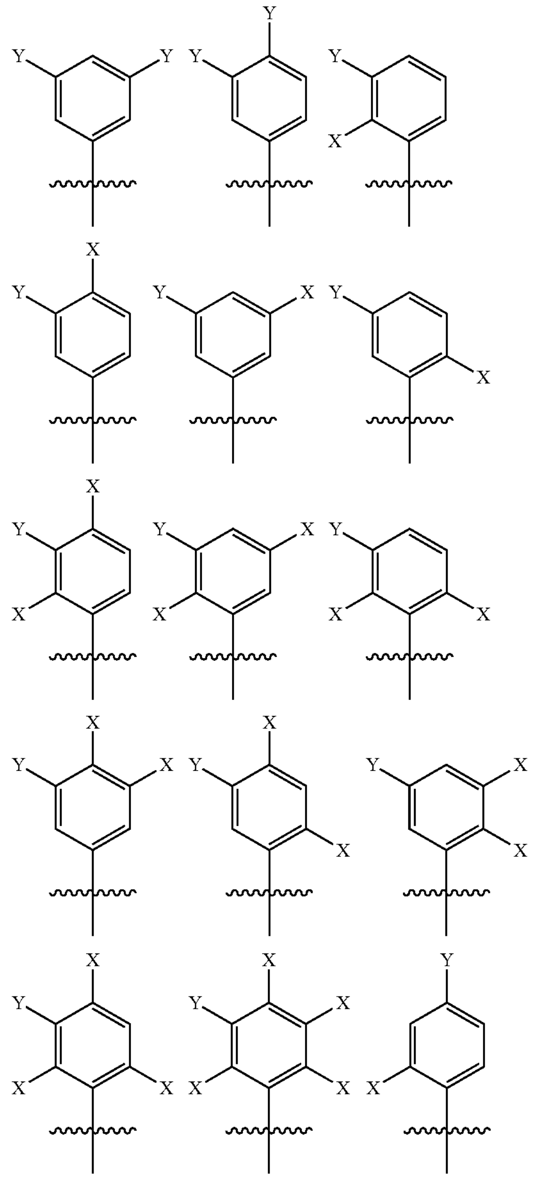

-continued

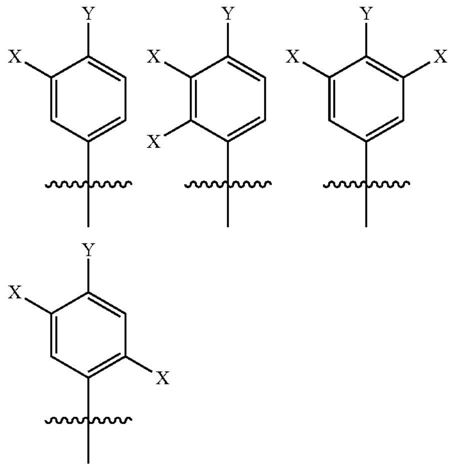

According to these exemplary embodiments, the Lewis acid catalyst is a boron based Lewis acid catalyst that has the general formula $B(R^1)_1(R^2)_1(R^3)_1(R^4)_{0\ or\ 1}$, whereas $R^1$, $R^2$, and $R^3$ are a fluoroalkyl-substituted phenyl group, and optionally $R^4$ is the functional group or functional polymer group. For example, the fluoroalkyl-substituted phenyl group is a 2,4-difluoro-3-(trifluoromethyl)phenyl group. For example, the fluoroalkyl-substituted phenyl group is a 2,4,6-trifluoro-3-(trifluoromethyl)phenyl group. In exemplary embodiments, at least one of $R^1$ or $R^2$ or $R^3$ is a 3,4- or 3,5-bis(fluoroalkyl)-substituted phenyl group (e.g., a 3,4- or 3,5-bis(trifluoromethyl)-substituted phenyl group). For example, $R^4$ is a cyclic ether having 3-10 carbon atoms. In another example, each of $R_1$, $R_2$, and $R_3$ is a fluoro/chloro-fluoroalkyl-substituted phenyl group, difluoro/chloro-fluoroalkyl-substituted phenyl group, trifluoro/chloro-fluoroalkyl-substituted phenyl group, or tetrafluoro/chloro-fluoroalkyl-substituted phenyl group.

Exemplary structures for the Lewis acid catalysts, where M is Boron are shown below:

Basic Catalyst Structure

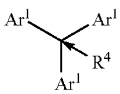

$Ar^1 = R^1, R^2, or\ R^3$
$Ar^2 = R^1, R^2, or\ R^3$
$Ar^3 = R^1, R^2, or\ R^3$
B = Boron Exemplary Structure 1

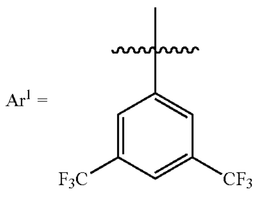

-continued

Exemplary Structure 2

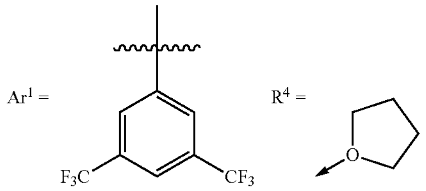

(includes optional R = $R^4$)

Exemplary Structure 3

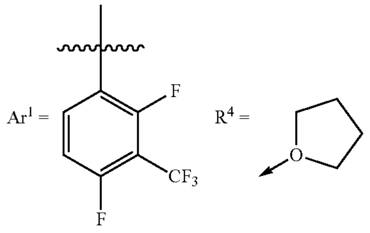

(includes optional R = $R^4$)

Exemplary Structure 4

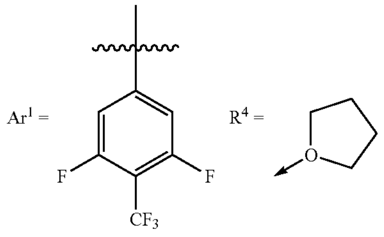

(includes optional R = $R^4$)

Exemplary Structure 5

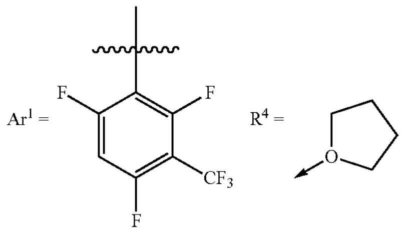

(includes optional R = $R^4$)

While the above illustrates exemplary structures that include boron, similar structures may be used that include other metals such as aluminum, indium, bismuth, and/or erbium.

According to other exemplary embodiments, the Lewis acid catalyst has the general formula $M(R^1)_1(R^2)_1(R^3)_1(R^4)_{0\ or\ 1}$, whereas M is boron, aluminum, indium, bismuth or erbium, $R^1$ includes a first fluoroalkyl-substituted phenyl group, $R^2$ includes a second fluoroalkyl-substituted phenyl group or a first fluoro-substituted phenyl group or a chloro-substituted phenyl group (i.e., a fluoro/chloro or fluoroalkyl-substituted substituted phenyl group), $R^3$ includes a third fluoroalkyl-substituted phenyl group or a second fluoro-substituted phenyl group or a chloro-substituted phenyl group (i.e., a fluoro/chloro or fluoroalkyl-substituted substituted phenyl group), and optional $R^4$ is the functional group or functional polymer group. The M in the general formula may exist as a metal salt ion or as an integrally bonded part of the formula. $R^1$, $R^2$, $R^3$ and $R^4$ are each independent of each other, e.g., a fluoroalkyl-substituted phenyl group of $R^1$ may be the same as or different from a fluoroalkyl-substituted phenyl group of $R^2$. Though, $R^1$ is different from at least one of $R^2$ and $R^3$, such that each of $R^1$, $R^2$, and $R^3$ are not all the same (e.g., same fluoroalkyl-substituted phenyl group), but $R^1$ may or may not be the same as $R^2$ or $R^3$.

$R^1$ may include the first fluoroalkyl-substituted phenyl group or may consist essentially of the first fluoroalkyl-substituted phenyl group. Similarly, $R^2$ may include the second fluoroalkyl-substituted phenyl group or the first fluoro/chloro-substituted phenyl group, or consist essentially of the second fluoroalkyl-substituted phenyl group or the first fluoro/chloro-substituted phenyl group. Similarly, $R^3$ may include the third fluoroalkyl-substituted phenyl group or the second fluoro/chloro-substituted phenyl group, or consist essentially of the third fluoroalkyl-substituted phenyl group or the second fluoro/chloro-substituted phenyl group. Similarly, $R^4$ may include the functional group or functional polymer group, or consist essentially of the $R^4$ is the functional group or functional polymer group.

With respect to $R^1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one. The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R^1$, $R^2$, or $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro group and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group).

With respect to $R^2$ and $R^3$, by fluoro-substituted phenyl group it is meant a phenyl group that includes at least one hydrogen atom replaced with a fluorine atom. By chloro-substituted phenyl group it is meant a phenyl group that includes at least one hydrogen atom replaced with a chlorine atom. The phenyl group of the fluoro/chloro-substituted phenyl group may be substituted with other groups (such as may include a combination of fluoro, chloro, and/or hydrogens), but excludes any fluoroalkyl groups (e.g., excludes the group having the structure $C_nH_mF_{2n+1-m}$ discussed above). Accordingly, the fluoro/chloro-substituted phenyl group is differentiated from the fluoroalkyl-substituted phenyl group, by the exclusion of any fluoroalkyl groups substituted on the phenyl ring.

With respect to optional $R^4$, the functional group or functional polymer group may be a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

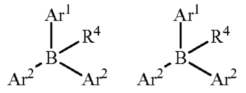

X = F, Cl

Y = fluoroalkyl group containing 1-5 carbons $R^4$ = optional and is a functional group or a functional polymer group $Ar^1$ =

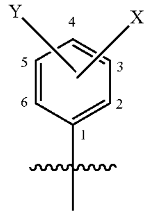

Y can be attached to positions 2, 3, 4, 5 or 6 or a combination of these

X can be attached to positions 2, 3, 4, 5 or 6 or a combination of these $Ar^2$ =

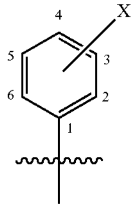

X can be attached to positions 2, 3, 4, 5 or 6 or a combination of these

Whereas for exemplary structures, $Ar^1$ is chosen from the following, referred to as the Set 1 structures:

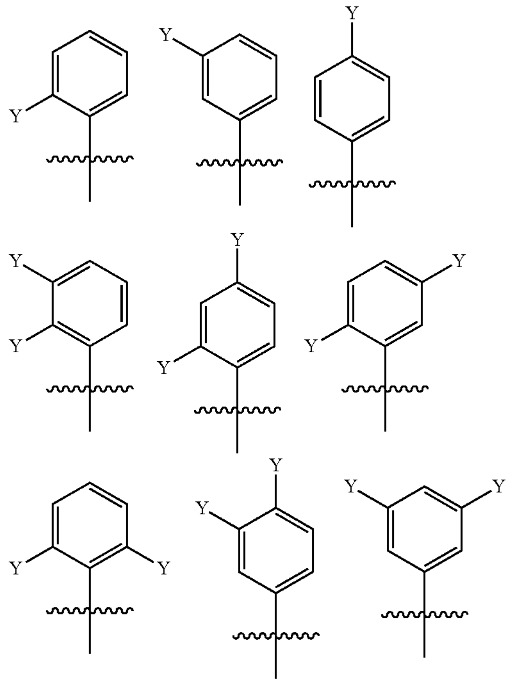

-continued
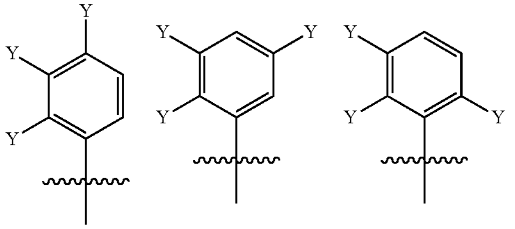
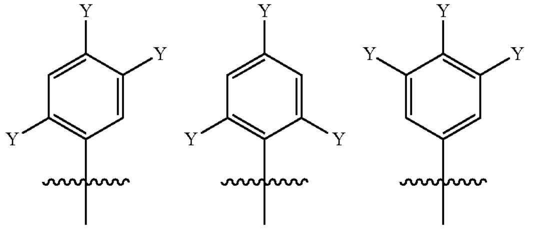
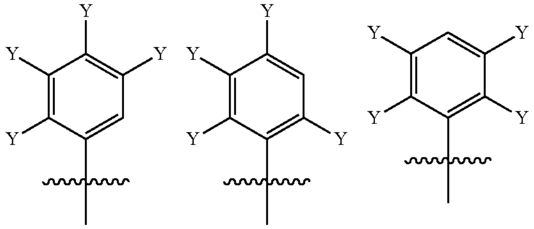
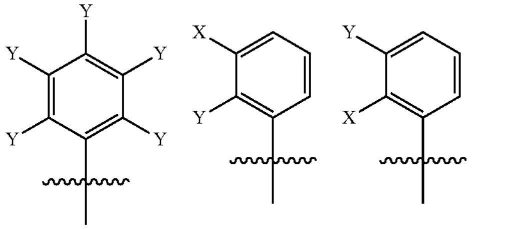
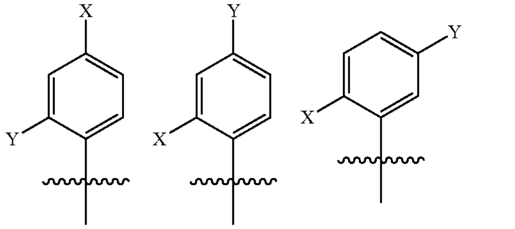
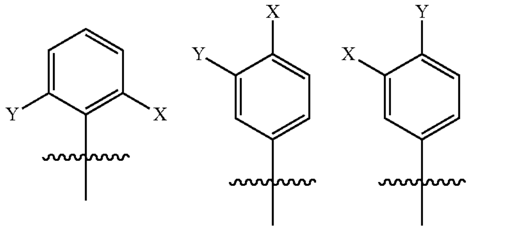
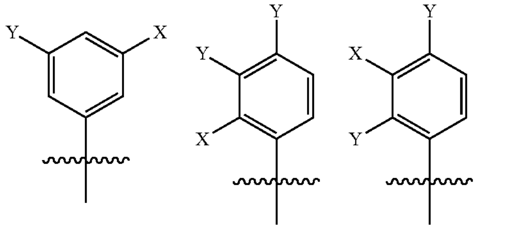
-continued
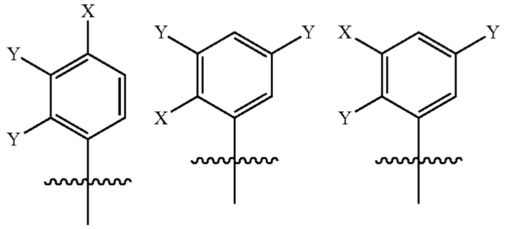
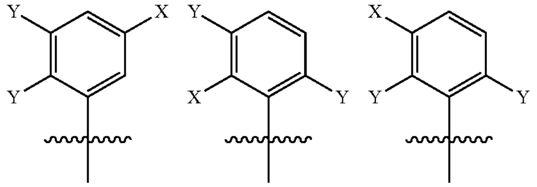
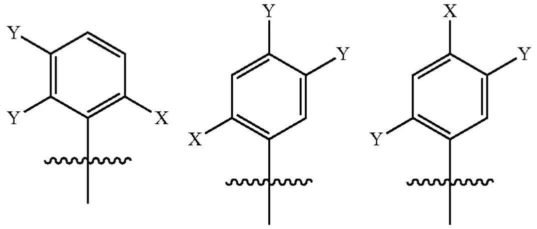
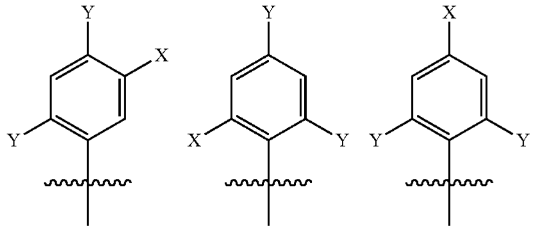
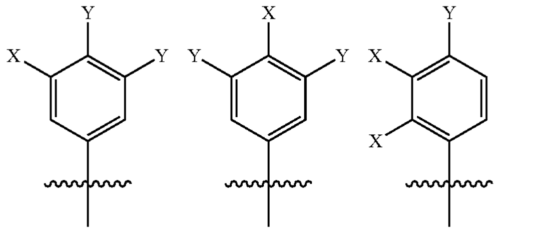
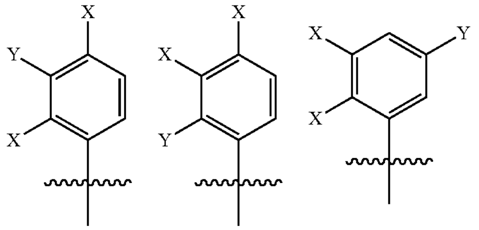
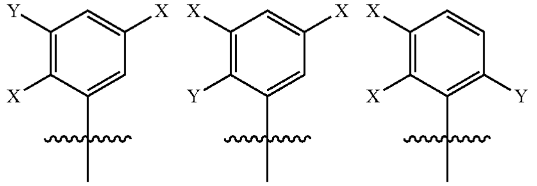

-continued
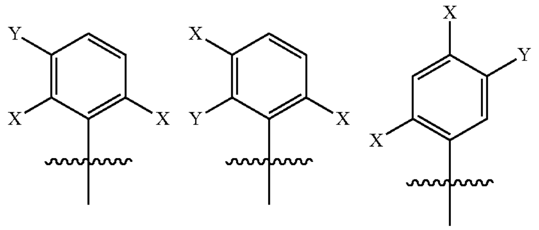
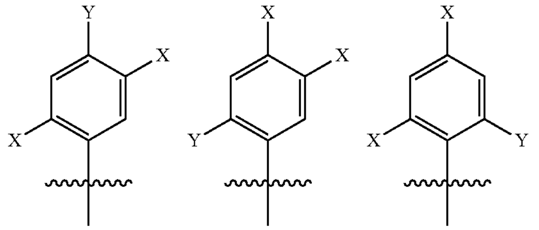
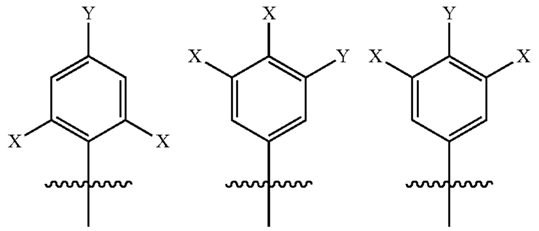
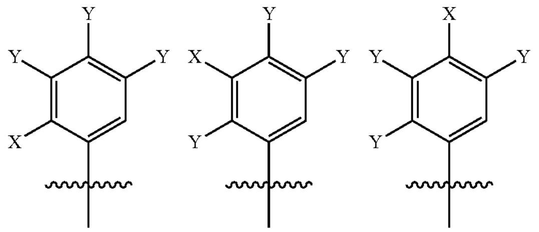
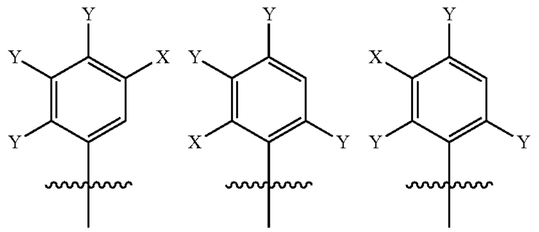
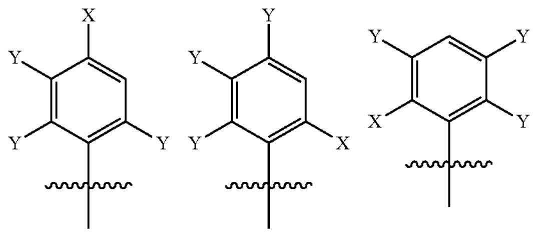
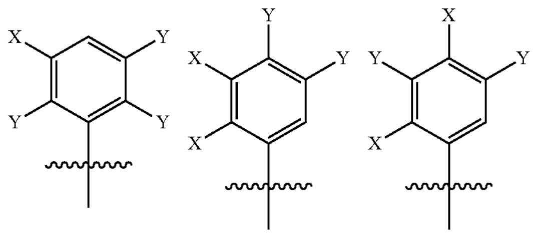
-continued
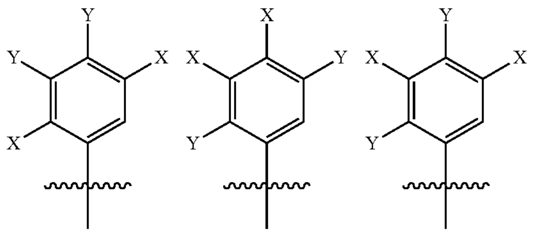
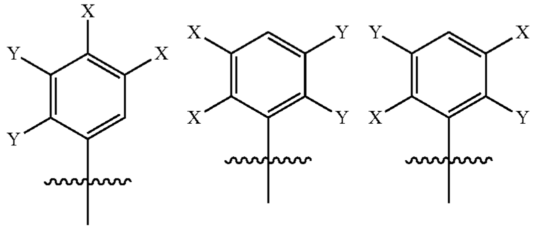
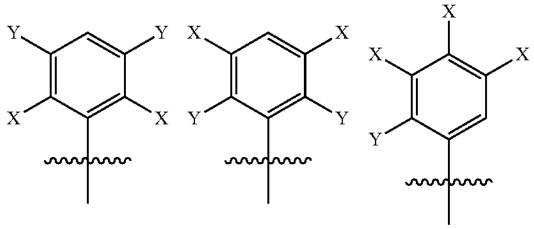
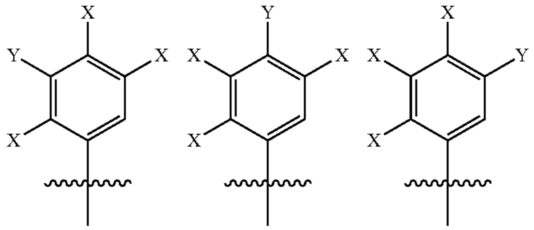
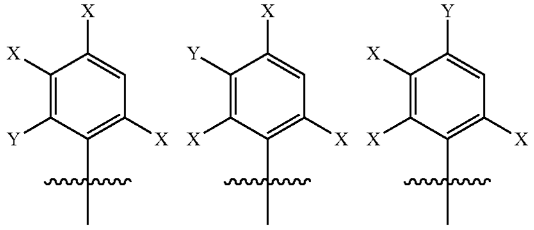
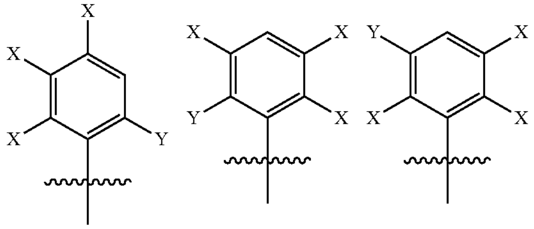
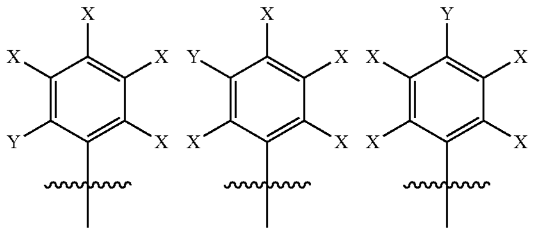

-continued
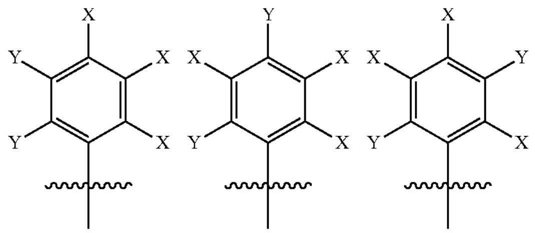
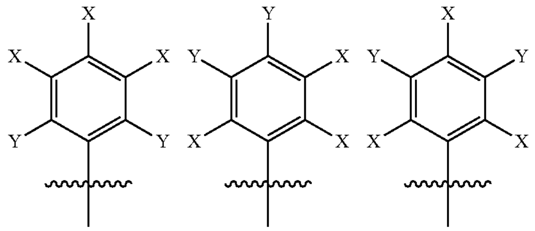
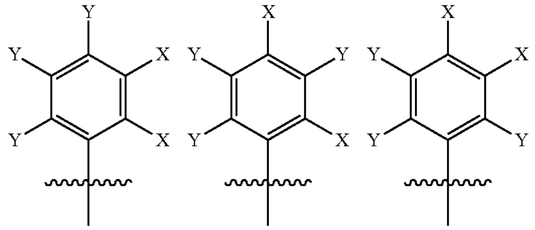
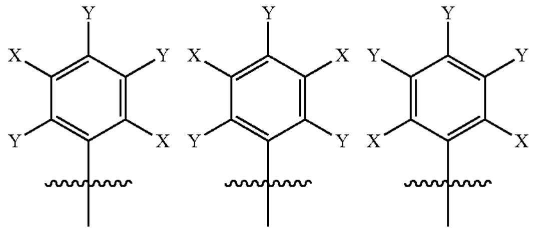
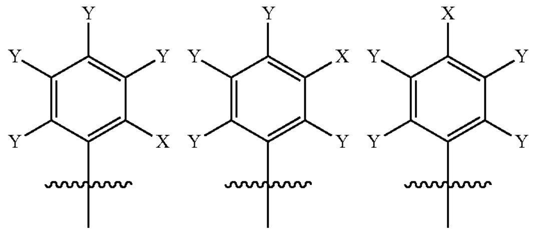
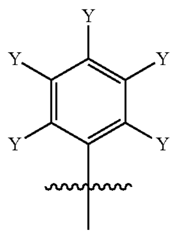
Whereas for exemplary structures, $Ar^2$ is chosen from the following, referred to as Set 2 structures:
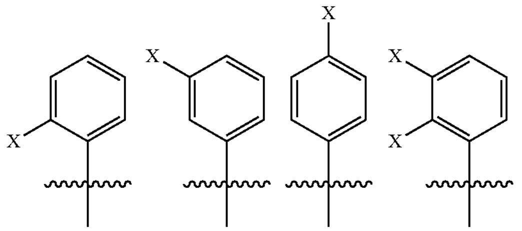
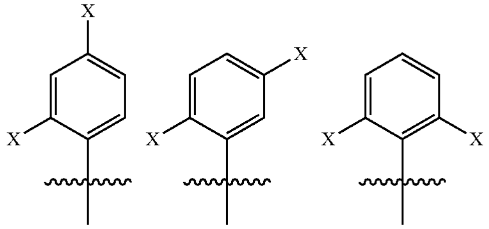
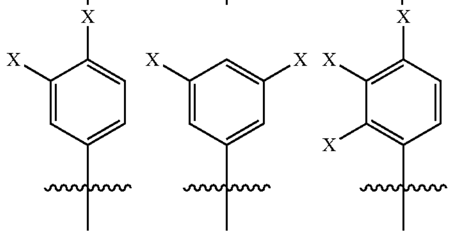
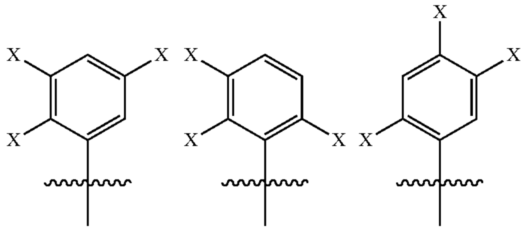
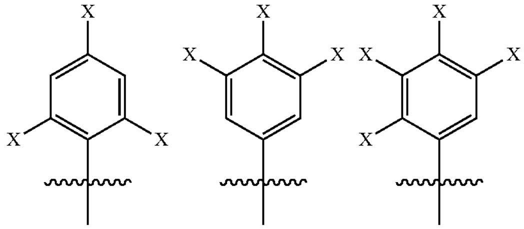
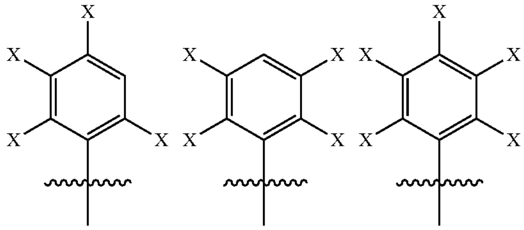
Further, the Lewis acid catalysts may have the following structures:
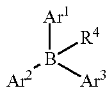
X = F, Cl
Y = fluoroalkyl group containing 1-5 carbons
$R^4$ = optional and is a functional group or a functional polymer group -continued $Ar^1$, $Ar^2$, $Ar^3$ = 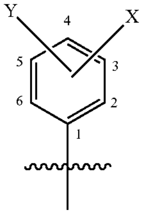

Y can be attached to positions
2, 3, 4, 5 or 6 or a combination of these
X can be attached to positions
2, 3, 4, 5 or 6 or a combination of these According to exemplary embodiments, the Lewis acid catalyst is a boron based Lewis acid catalyst that has the general formula $B(R^1)_1(R^2)_1(R^3)_1(R^4)_{0\ or\ 1}$, whereas $R^1$ is the first fluoroalkyl-substituted phenyl group (e.g., any structure from Set 1 structures), $R^2$ is the second fluoroalkyl-substituted phenyl group (e.g., any structure from Set 1 structures) or the first fluoro/chloro-substituted phenyl group (e.g., any structure from Set 2 structures), $R^3$ is the third fluoroalkyl-substituted phenyl group (e.g., any structure from Set 1 structures) or the second fluoro/chloro-substituted phenyl group (e.g., any structure from Set 2 structures), and optional $R^4$ is the functional group or functional polymer group, as discussed above. In exemplary embodiments, at least one of $R^1$ or $R^2$ or $R^3$ is a 3,4- or 3,5-bis (fluoroalkyl)-substituted phenyl group (e.g., a 3,4 or 3,5-bis (trifluoromethyl)-substituted phenyl group). For example, $R^4$ is a cyclic ether having 3-10 carbon atoms.

Exemplary structures for the Lewis acid catalysts, where M is Boron are shown below:

Basic Catalyst Structure

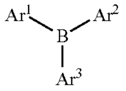

$Ar^1 = R^1, R^2,$ or $R^3$
$Ar^2 = R^1, R^2,$ or $R^3$
$Ar^3 = R^1, R^2,$ or $R^3$
B = Boron
Any of the structures may
include optional $R = R^4$ Exemplary Structure 6

$Ar^1$, $Ar^2$ = 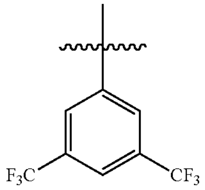

$Ar^3$ = 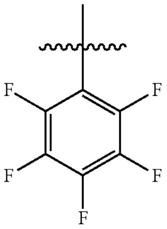 $R^4$ = 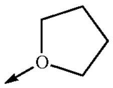

-continued

Exemplary Structure 7

$Ar^1$, $Ar^2$ = 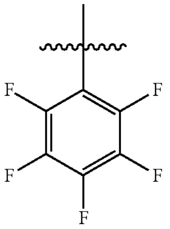

$Ar^3$ = 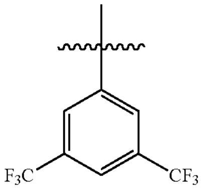 $R^4$ = 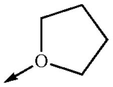

Exemplary Structure 8

$Ar^1$, $Ar^2$ = 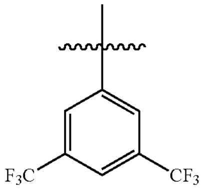

$Ar^3$ = 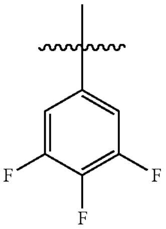

Exemplary Structure 9

$Ar^1$, $Ar^2$ = 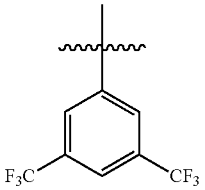

$Ar^3$ = 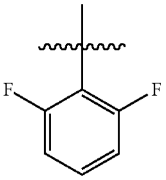 $R^4$ = 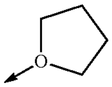

Exemplary Structure 10

$Ar^1$, $Ar^2$ = 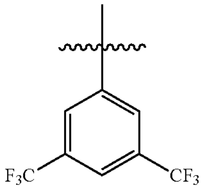

$Ar^3$ = 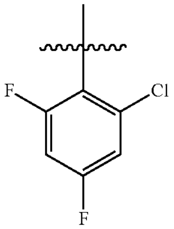 $R^4$ = 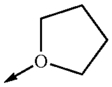

-continued

Exemplary Structure 11

$Ar^1$, $Ar^2$ =

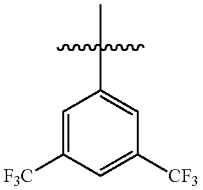

$Ar^3$ =

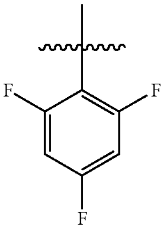

$R^4$ =

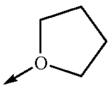

Exemplary Structure 12

$Ar^1$, $Ar^2$ =

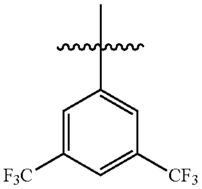

$Ar^3$ =

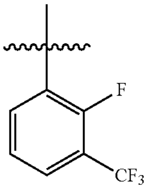

$R^4$ =

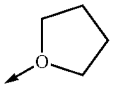

Exemplary Structure 13

$Ar^1$, $Ar^2$ =

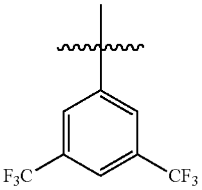

$Ar^3$ =

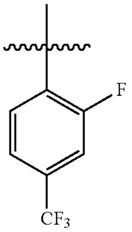

$R^4$ =

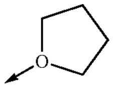

Exemplary Structure 14

$Ar^1$, $Ar^2$ =

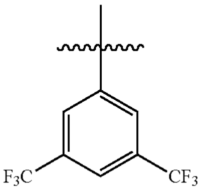

$Ar^3$ =

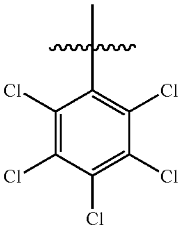

-continued

Exemplary Structure 15

$Ar^1$, $Ar^2$ =

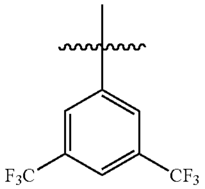

$Ar^3$ =

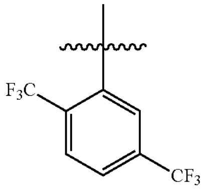

$R^4$ =

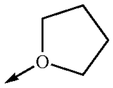

Exemplary Structure 16

$Ar^1$, $Ar^2$ =

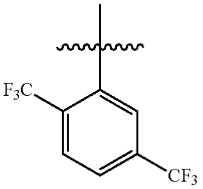

$Ar^3$ =

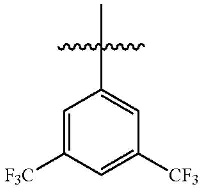

Exemplary Structure 17

$Ar^1$, $Ar^2$ =

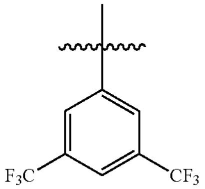

$Ar^3$ =

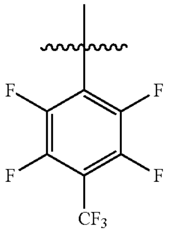

$R^4$ =

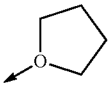

Exemplary Structure 18

$Ar^1$, $Ar^2$ =

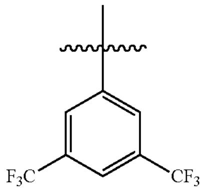

$Ar^3$ =

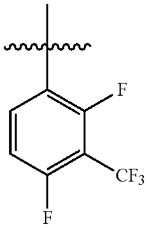

$R^4$ =

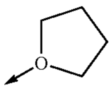

While the above illustrates exemplary structures that include boron, similar structures may be used in which boron is replaced by metals such as aluminum, indium, bismuth, and/or erbium. Further, exemplary embodiments may utilize a blend or mixture of catalysts, e.g., using one or more of the catalyst structures above.

For example, referring to the other exemplary embodiments, the Lewis acid catalyst has the following structure that includes at least one 3,5-bis(trifluoromethyl)-substituted phenyl group (in this instance a 3,5-bis(trifluoromethyl)-substituted phenyl group) and at least one substituted phenyl group (i.e., Ar) independently selected from the structures shown below:

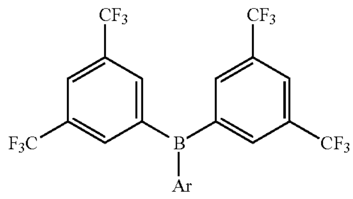

or

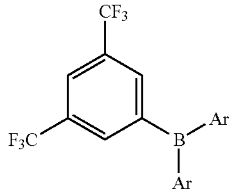

Ar selected from

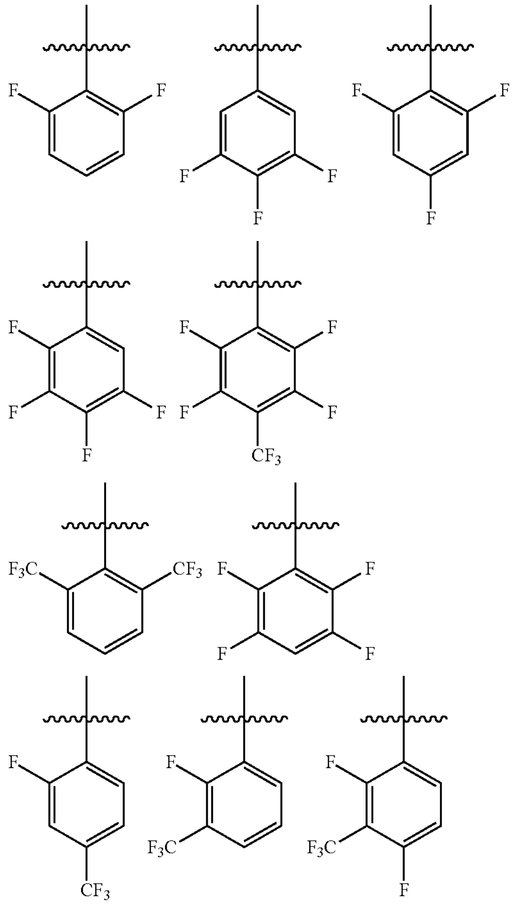

-continued

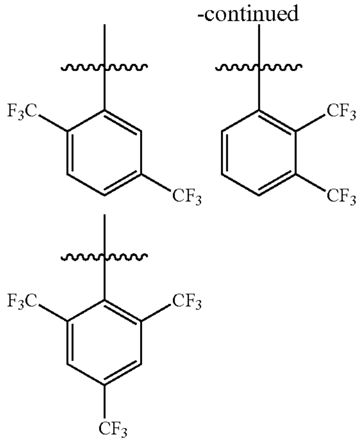

The M in the general formula may exist as a metal salt ion or as an integrally bonded part of the formula. $R^1$, $R^2$, $R^3$, and $R^4$ are each independent of each other, e.g., a Set 1 structure of $R^2$ may be the same as or different from a Set 1 structure of $R^3$.

As discussed above, with respect to optional $R^4$, above, the functional group or functional polymer group may be a Lewis base that forms a complex with the Lewis acid catalyst (e.g., a boron based Lewis acid catalyst) and/or a molecule or moiety that contains at least one electron pair that is available to form a dative bond with a Lewis acid.

With respect to the above, exemplary embodiments may utilize a blend of catalyst, e.g., using one or more of the catalysts structures above. The Lewis acid catalyst used in exemplary embodiments may be a blend catalyst that includes one or more Lewis acid catalysts (e.g., each having the general formula $B(R^1)_1(R^2)_1(R^3)_1(R^4)_{0\ or\ 1}$) and optionally at least one other catalyst (e.g., such as catalysts known in the art for producing polyether polyols). The blend catalyst may optionally include other catalysts, in which the one or more Lewis acid catalysts having the general formula $B(R^1)_1(R^2)_1(R^3)_1(R^4)_{0\ or\ 1}$ account for at least 25 wt %, at least 50 wt %, at least 70 wt %, at least 75 wt %, at least 80 wt %, at least 85 wt %, at least 90 wt %, at least 95 wt %, at least 99 wt %, etc., of the total weight of the blend catalyst. Exemplary other metal based Lewis acids that are active at lower temperatures may be included as part of the dual catalyst system and/or the blend catalyst. Exemplary metal-based Lewis acids are based on one of aluminum, boron, copper, iron, silicon, tin, titanium, zinc, and zirconium.

For example, the added blend catalyst may include or exclude any DMC based catalysts. In exemplary embodiments, the DMC catalyst is a zinc hexacyanocobaltate catalyst complex. The DMC catalyst may be complexed with t-butanol. The DMC catalyst used in exemplary embodiments may be a blend catalyst that includes of one or more DMC catalysts. The blend catalyst may optionally include a non-DMC catalyst, in which the DMC catalysts account for at least 75 wt % of the total weight of the blend catalyst.

The Lewis acid catalyst polymerized polyether polyol in formed in an alkoxylation process of low hydroxyl equivalent weight starter compounds, also referred to as the initiator, the process may proceed directly from the initiator to a finished polyether alcohol by the polymerization of propylene oxide and optionally ethylene oxide. A catalyst activation step may not be required when using the specific Lewis acid catalyst.

The initiator includes one or more compounds having a low molecular weight and a numerical hydroxyl functionality of at least 2. The initiator is any organic compound that is to be alkoxylated in the polymerization reaction. The initiator may contain as many as 10 hydroxyl groups. For example, the initiator may be a diol or triol. Mixtures of starter compounds/initiators may be used. The initiator will have a hydroxyl equivalent weight less than that of the polyether product, e.g., may have a hydroxyl equivalent weight of less than 500 g/mol equivalence, less than 300 g/mol equivalence, greater than 20 g/mol equivalence, from 20 to 300 g/mol equivalence, from 20 to 200 g/mol equivalence, from 30 to 150 g/mol equivalence, etc. Exemplary, initiator compounds include, but are not limited to, ethylene glycol, diethylene glycol, triethylene glycol, propylene glycol, dipropylene glycol, tripropylene glycol, 1,4-butanediol, 1,6-hexanediol, 1,8-octanediol, cyclohexane dimethanol, glycerin, trimethylolpropane, trimethylolethane, pentaerythritol, sorbitol, sucrose, and/or alkoxylates (especially ethoxylates and/or propoxylates) any of these that have a weight average molecular weight less than that of the product of the polymerization.

When the Lewis acid catalyst is used, the temperature of the reactor may be reduced at least 20° C. as compared to when the DMC catalyst is used. For example, the temperature for use of a DMC catalyst may be from 125° C. to 160° C. (e.g., during a time at which a propylene oxide feed is gradually/slowly added to the reactor and after the time at which the starter compound is mixed with the DMC catalyst). The temperature for use of the Lewis acid catalyst may be from 25° C. to 115° C. and/or from 60° C. to 115° C. In exemplary embodiments, the control of the relative contribution of a mixture containing an active DMC catalyst and an active Lewis acid may enable the Lewis acid to dominate the addition of oxirane onto chain ends.

The polymerization reaction can be performed in any type of vessel that is suitable for the pressures and temperatures encountered. In a continuous or semi-continuous process the vessel may have one or more inlets through which the alkylene oxide, additional initiator compound, catalyst, hydrogen bond acceptor additive, air or inert gas (purge or blanket gas such as nitrogen) and optional solvent may be introduced before or during the reaction. In a continuous process, the reactor vessel should contain at least one outlet through which a portion of the partially or fully polymerized reaction mixture may be withdrawn. A tubular reactor that has single or multiple points for injecting the starting materials, a loop reactor, and a continuous stirred tank reactor (CSTR) are all suitable types of vessels for continuous or semi-continuous operations. An exemplary process is discussed in U.S. Patent Publication No. 2011/0105802.

The resultant polyether alcohol product may be further treated, e.g., in a flashing process and/or stripping process. The polyether alcohol may be a finished or non-finished alcohol. For example, the polyether alcohol may include the Lewis acid catalyst, or the polyether alcohol may be treated to reduce catalyst residues even though some of the catalyst residue may be retained in the product. Moisture may be removed by stripping the polyol. The polyether alcohol derived from ethylene oxide, propylene oxide and/or butylene oxide according to embodiments may have a Lewis acid catalyst concentration (in ppm in the final polyol) of from 25 ppm to 1000 ppm (e.g., 50 ppm to 100 ppm, 100 ppm to 500 ppm and/or 100 ppm to 250 ppm).

All parts and percentages are by weight unless otherwise indicated. All molecular weight values are based on number average molecular weight unless otherwise indicated.

EXAMPLES

Approximate properties, characters, parameters, etc., are provided below with respect to various working examples, comparative examples, and the materials used in the working and comparative examples.

Prepolymer Preparation

Working Examples 1 to 3 and Comparative Example A each include a prepolymer that is prepared by reacting an isocyanate product of 4,4'-MDI, available as Millionate® MT available from Tosoh, and a polyol product, available as VORANOL™ 1000LM (a PO homopolymer diol having a weight average molecular weight of approximately 1000 g/mol from Dow, Inc.). The reaction temperature is 80° C. The method includes putting Millionate® MT and VORANOL™ 1000LM together in an open flask and starting stirring by mixer at 450 rpm. Then, a mantle heater is put to the flask to set the temperature as 80° C. In-Process NCO check is done every 1 hour. Prepolymer reaction is completed when the NCO decrease per hour is less than 0.1 wt %. The resulting prepolymer has a clear, transparent appearance, 11.4 wt % NCO and viscosity at 5709 mPa·s at 25° C.

Polyol Preparation

The polyols are prepared as discussed in International Publication Nos. WO/2019/055725 and WO/2019/055727.

Polyol 1: A 1.8 L pressure reactor is charged with 294 grams of Glycerin. The reaction was catalyzed using 82 mg of Catalyst 2. Propylene oxide (1145 g) is added to the reactor at a reaction temperature of 80° C. and a feed rate of 6.0 mL/min. Upon completion of propylene oxide feed, the reaction is allowed to digest for a period of 70 min. The reactor is cooled to 50° C. and the product is collected (1367 g, 95%). By gel permeation chromatography, number-average molecular weight=287; acetals (weight fraction of aldehyde chemically bound in the polyol)=0.53 wt %; polydispersity=2.20.

Polyol 2: A 1.8 L pressure reactor is charged with 296 grams of Glycerin. The reaction was catalyzed using 142 mg of Catalyst 2. Propylene oxide (1188 g) is added to the reactor at a reaction temperature of 80° C. and a feed rate of 2.8 mL/min Upon completion of propylene oxide feed, the reaction is allowed to digest for a period of 30 min. The reactor is cooled to 50° C. and the product is collected (1410 g, 95%). By gel permeation chromatography, number-average molecular weight=460; acetals (weight fraction of aldehyde chemically bound in the polyol)=0.48 wt %; polydispersity=1.48.

Polyol 3: A 1.8 L pressure reactor is charged with 275 grams of Glycerin. The reaction was catalyzed using 144 mg of Catalyst 2. Propylene oxide (1070 g) is added to the reactor at a reaction temperature of 80° C. and a feed rate of 2.8 mL/min Upon completion of propylene oxide feed, the reaction is allowed to digest for a period of 50 min. The reactor is cooled to 50° C. and the product is collected (1278 g, 95%). By gel permeation chromatography, number-average molecular weight=455; acetals (weight fraction of aldehyde chemically bound in the polyol)=0.58%; polydispersity=1.73.

Polyol 4: A 1.8 L pressure reactor is charged with Glycerin and Propylene oxide as discussed above, except different catalyst is used.

Polyol 5: Same as Polyol 4, except treated.

Polyol 6: Same as Polyol 4, except treated.

Polyol A: VORANOL™ CP450 available from The Dow Chemical Company or affiliated companies.

Polyol B: VORANOL™ polyol available from The Dow Chemical Company or affiliated companies.

TABLE 1

| Polyol | Initiator | Primary OH Content % | Acetal (weight fraction of aldehyde chemically bound in the polyol) wt % | OH Number mg KOH/g | Water ppm |
|---|---|---|---|---|---|
| Polyol 1 | Glycerin | 57.6 | 0.53 | 370 | 313 |
| Polyol 2 | Glycerin | 57.5 | 0.48 | 367 | 250 |
| Polyol 3 | Glycerin | 57.4 | 0.58 | 371 | 365 |
| Polyol 4 | Glycerin | | | | |
| Polyol 5 | Glycerin | | | | |
| Polyol 6 | Glycerin | | | | |
| Polyol A | Glycerin | <3 | 0 | 385 | 169 |
| Polyol B | Glycerin | <3 | 0 | 389 | |

The OH Number is determined by ASTM D4274 Method D. Water content is determined by standard Karl Fischer titration technique following ASTM D4672. Number average molecular weight (Mn) is measured in accordance to ASTM D5296.

The GPC analysis is performed using a High-Performance Liquid Chromatography (HPLC) system equipped with an inline degasser (Agilent G1322A), a liquid autosampler (Agilent G1329A), a quaternary pump (Agilent G1311A), a thermostat column compartment (Brinkmann CH-30), a refractive index (RI) detector (Agilent G1362A), a PLgel 5-μm guard column (50 mm×7.5 mm), and a series of four PLgel 5-μm (300 mm×7.5 mm) narrow porosity analytical columns (50, 100, 1000, 10000 Å).

Uninhibited tetrahydrofuran (THF) is used as the mobile phase at a flow rate of 1 mL/min while the column and detector temperatures were set to 40° C. The sample is dissolved in mobile phase (~1%) and filtered through a 0.45 μm PTFE membrane. A 100-μL aliquot of the sample solution is injected and analyzed over a 50 minute run time. The sample results are quantitated using Empower Pro software (Waters Corp.) against a third order (cubic) standard curve comprised of twelve narrowly distributed PEG standards (44000-238 Mp; Sigma-Aldrich (Fluka) ReadyCal Set). The standards used for polymer molecular weight calibration are polyethylene glycols having mono-dispersed molecular weights. The molecular distributions reported here are relative (PEG) values and should not be considered as absolute molecular weights. Acetal weight percent is determined from integration of the high molecular weight shoulder relative to the main polyol peak found in GPC.

Samples are prepared in 10 mm NMR tubes as ~88% solutions in DMSO-$d_6$ for $^{13}$C-NMR analysis to measure the level of acetal species. $^{13}$C NMR data is acquired using a Bruker Avance 400 MHz spectrometer equipped with a selective excitation probe using at least 1280 transient scans and a 30 second relaxation delay (verified to be adequate). The acquisition is carried out using spectral width of 23,800 Hz and a file size of 65K data points. Relative moles of aldehyde bound as acetal species in the original method are measured by integrating area under resonances from acetal methyl groups.

Mol % acetal=100*Relative moles of acetal/Sum of relative moles of all species in the spectrum Relative mass=Relative moles*MW of propionaldehyde weight fraction of aldehyde chemically bound in the polyol (%)=100*Relative mass of aldehyde bound in acetal/Sum of relative mass of all species Samples of polyether polyol are, as indicated, additionally exposed to a commercial spherical zeolite in order to reduce the water content Film Preparation Working Examples 1 to 5 and Comparative Examples A to C are prepared as follows. Working Examples 1, 4, and 5 include Polyol 1, Working Example 2 includes Polyol 2, and Working Example 3 includes Polyol 3. Comparative Example A to C includes Polyol A. Approximately 30 grams of the Prepolymer from above and approximately 11 grams (amount depending on OH number to achieve an approximate isocyanate index of 106, with a final index range of 102 to 110) of the appropriate polyol are added to a plastic cup to form a reaction mixture. Then, the reaction mixture is stirred for 2 min and then put in the vacuum bell for 5 min until no visual bubbling is observed. Next, cast films are prepared using an automatic film maker. The cast films have an average thickness of approximately 300 micron. The curing condition and period are 23° C., 50% RH for 5 days and 40° C. for 2 days for full cure.

Evaluation of these examples is shown below in Table 2.

TABLE 2

| Example | Tensile Strength MPa | Elongation at Break % | Elongation at Break (between chuck) % | Tear Resistance N/mm | Visual Film Appearance |
|---|---|---|---|---|---|
| Working Ex. 1 | 3.3 | 480 | 382 | 10.2 | Transparent and few bubbles |
| Working Ex. 2 | 5.3 | 500 | 408 | 9.8 | Transparent and few bubbles |
| Working Ex. 3 | 4.4 | 500 | 408 | 9.4 | Transparent and few bubbles |
| Working Ex. 4 | 5.08 | 395 | 460 | 9.1 | Transparent and few bubbles |
| Working Ex. 5 | 6.73 | 355 | 420 | 12.2 | Transparent and few bubbles |
| Comparative Ex. A | 1.1 | 340 | 188 | 9.3 | Transparent but many bubbles observed |
| Comparative Ex. B | 1.06 | 164 | 220 | 9.1 | Transparent but many bubbles observed |
| Comparative Ex. C | 1.33 | 147 | 240 | 10.9 | Transparent but many bubbles observed |

Referring to the above, it is seen that fewer bubbles are realized for Working Examples 1 to 5, in comparison to Comparative Examples A to C. Tensile strength is measured according to JIS K7127. Elongation at break is measured according to JIS K7127. Elongation at break (between chuck) is measured according to JIS K7127. Tear resistance is measured according to JIS K7128-3. Film appearance refers to notes that are visually observed. Photos of Working Examples 1-3 and Comparative Example A are shown in FIG. 1.

Working Examples 6 to 10 are prepared as shown below, at an approximate isocyanate index of 106. In particular, cured elastomers approximately 42 mm in depth are created by combining the Prepolymer above and the appropriate polyol at the desired index along with 0.5 wt % BYK®-054 (available from BYK). The samples are mixed via a Flack-Tek mixer for 1 minute at 2300 rpm, following by degassing under vacuum for 5 minutes. The samples were then allowed to cure at room temperature in a closed cup for 5 days at room temperature, then at 40° C. for 2 days.

Evaluation of these examples is shown below in Table 3.

TABLE 3

| Example | Pre-polymer wt % | Polyol B wt % | Polyol 4 wt % | Elongation at Break (between chuck) % | Tear Resistance N/mm | Visual Film Appearance |
|---|---|---|---|---|---|---|
| Working Ex. 6 | 73.9 | 26.1 | 0.0 | | | |
| Working Ex. 7 | 73.9 | 19.7 | 6.4 | | | |
| Working Ex. 8 | 73.9 | 13.0 | 13.1 | | | |
| Working Ex. 9 | 73.9 | 6.4 | 19.7 | | | |
| Working Ex. 10 | 73.9 | 0.0 | 26.1 | | | |

Working Examples 11 to 15 are prepared as shown below, at an approximate isocyanate index of 105. In particular, cured elastomers approximately 42 mm in depth are created by combining the Prepolymer above and the appropriate polyol at the desired index along with 0.5 wt % BYK®-054. The samples are mixed via a FlackTek mixer for 1 minute at 2300 rpm, following by degassing under vacuum for 5 minutes.

The samples were then allowed to cure at room temperature in a closed cup for 5 days at room temperature, then at 40° C. for 2 days.

Evaluation of these examples is shown below in Table 4.

TABLE 4

| Example | Pre-polymer wt % | Polyol B wt % | Polyol C wt % | Elongation at Break (between chuck) % | Tear Resistance N/mm | Visual Film Appearance |
|---|---|---|---|---|---|---|
| Working Ex. 11 | 73.9 | 26.1 | 0.0 | | | |
| Working Ex. 12 | 73.9 | 19.7 | 6.4 | | | |
| Working Ex. 13 | 73.9 | 13.0 | 13.1 | | | |
| Working Ex. 14 | 73.9 | 6.4 | 19.7 | | | |
| Working Ex. 15 | 73.9 | 0.0 | 26.1 | | | |

Working Examples 16 to 20 are prepared as shown below, at an approximate isocyanate index of 105. In particular, cured elastomers approximately 42 mm in depth are created by combining the Prepolymer above and the appropriate polyol at the desired index along with 0.5 wt % BYK®-054. The samples are mixed via a FlackTek mixer for 1 minute at 2300 rpm, following by degassing under vacuum for 5 minutes. The samples were then allowed to cure at room temperature in a closed cup for 5 days at room temperature, then at 40° C. for 2 days.

Evaluation of these examples is shown below in Table 5.

TABLE 5

| Example | Pre-polymer wt % | Polyol 4 wt % | Polyol 5 wt % | Elongation at Break (between chuck) % | Tear Resistance N/mm | Visual Film Appearance |
|---|---|---|---|---|---|---|
| Working Ex. 16 | 73.9 | 26.1 | 0.0 | | | |
| Working Ex. 17 | 73.9 | 19.7 | 6.4 | | | |
| Working Ex. 18 | 73.9 | 13.0 | 13.1 | | | |
| Working Ex. 19 | 73.9 | 6.4 | 19.7 | | | |
| Working Ex. 20 | 73.9 | 0.0 | 26.1 | | | |

Working Examples 21 to 25 are prepared as shown below, at an approximate isocyanate index of 105. In particular, cured elastomers approximately 42 mm in depth are created by combining the Prepolymer above and the appropriate polyol at the desired index along with 0.5 wt % BYK®-054. The samples are mixed via a FlackTek mixer for 1 minute at 2300 rpm, following by degassing under vacuum for 5 minutes. The samples were then allowed to cure at room temperature in a closed cup for 5 days at room temperature, then at 40° C. for 2 days.

Evaluation of these examples is shown below in Table 6.

TABLE 6

| Example | Pre-polymer wt % | Polyol 4 wt % | Polyol 6 wt % | Elongation at Break (between chuck) % | Tear Resistance N/mm | Visual Film Appearance |
|---|---|---|---|---|---|---|
| Working Ex. 21 | 73.9 | 26.1 | 0.0 | | | |
| Working Ex. 22 | 73.9 | 19.7 | 6.4 | | | |
| Working Ex. 23 | 73.9 | 13.0 | 13.1 | | | |
| Working Ex. 24 | 73.9 | 6.4 | 19.7 | | | |
| Working Ex. 25 | 73.9 | 0.0 | 26.1 | | | |

Working Examples 26 to 27 and Comparative Examples D and E are prepared as shown below, at an approximate isocyanate index of 111. In particular, cured elastomers approximately 42 mm in depth are created by combining the Prepolymer above and the appropriate polyol at the desired index along with 0.5 wt % BYK®-054. The samples are mixed via a FlackTek mixer for 1 minute at 2300 rpm, following by degassing under vacuum for 5 minutes. The samples were then allowed to cure at room temperature in a closed cup for 5 days at room temperature, then at 40° C. for 2 days.

Evaluation of these examples is shown below in Table 7.

TABLE 7

| Example | Prepolymer wt % | Polyol 4 wt % | Polyol 5 wt % | Polyol B wt % | Polyol C wt % | Elongation at Break (between chuck) % | Tear Resistance N/mm | Visual Film Appearance |
|---|---|---|---|---|---|---|---|---|
| Working Ex. 26 | 73.9 | 26.1 | 0 | 0 | 0 | | | |
| Working Ex. 27 | 73.9 | 0 | 26.1 | 0 | 0 | | | |
| Comparative Ex. D | 73.9 | 0 | 0 | 26.1 | 0 | | | |
| Comparative Ex. E | 73.9 | 0 | 0 | 0 | 26.1 | | | |

Referring to the above, it is seen improved visual film appearance is achieved for the working examples.

The invention claimed is:

1. A coating, adhesive, sealant, elastomer, or reaction injection molded material forming polyurethane composition, the composition comprising:

an isocyanate component that includes at least one isocyanate-terminated prepolymer, and an isocyanate reactive component that includes at least one Lewis acid catalyst polymerized polyether polyol having a weight average molecular weight from 200 g/mol to 1,000 g/mol, an average primary hydroxyl group content of at least 30% based on total number of hydroxyl groups, and an average acetal content of at least 0.05 wt % based on total weight of the Lewis acid catalyst polymerized polyol, a Lewis acid catalyst for forming the Lewis acid catalyst polymerized polyether polyol having a general formula $M(R^1)_1(R^2)_1(R^3)_1(R^4)_1$, whereas M is boron, aluminum, indium, bismuth or erbium, $R^1$, $R^2$, $R^3$, and $R^4$ are each independent, $R^1$ includes a first fluoro/chloro or fluoroalkyl-substituted phenyl group, $R^2$ includes a second fluoro/chloro or fluoroalkyl-substituted phenyl group, $R^3$ includes a third fluoro/chloro or fluoroalkyl-substituted phenyl group or a first functional group or functional polymer group, $R^4$ is a second functional group or functional polymer group.

2. The composition as claimed in claim 1, wherein the isocyanate-terminated prepolymer is the reaction product of a polyisocyanate and a DMC catalyst polymerized polyether polyol having a weight average molecular weight from 300 g/mol to 3,500 g/mol.

3. The composition as claimed in claim 1, wherein the composition includes from 56 wt to 86 wt % of the isocyanate component and 14 wt % to 44 wt % of the isocyanate-reactive component.

4. The composition as claimed in claim 1, wherein the Lewis acid catalyst polymerized polyol is present in an amount of at least 50 wt % based on a total weight of the isocyanate-reactive component.

5. The composition as claimed in claim 1, wherein $R^3$ includes the third fluoro/chloro or fluoroalkyl-substituted phenyl group.

6. The composition as claimed in claim 1, wherein the first fluoro/chloro or fluoroalkyl-substituted phenyl group and the second fluoro/chloro or fluoroalkyl-substituted phenyl group are the same.

7. The composition as claimed in claim 1, wherein $R^3$ includes the third fluoro/chloro or fluoroalkyl-substituted phenyl group and the first fluoro/chloro or fluoroalkyl-substituted phenyl group and the second fluoro/chloro or fluoroalkyl-substituted phenyl group are the same.

8. The composition as claimed in claim 1, wherein $R^3$ includes the third fluoro/chloro or fluoroalkyl-substituted phenyl group and the first fluoro/chloro or fluoroalkyl-substituted phenyl group, the second fluoro/chloro or fluoroalkyl-substituted phenyl group, and the third fluoro/chloro or fluoroalkyl-substituted phenyl group are the same.

9. A coating, adhesive, sealant, elastomer, or reaction injection molded material formed with the composition as claimed in claim 1, a polyether alcohol being a non-finished alcohol.

10. A method of making a coating, adhesive, sealant, elastomer, or reaction injection molded material, the method comprising providing the composition as claimed in claim 1.

* * * * *